(12) United States Patent
Wang et al.

(10) Patent No.: US 10,948,710 B2
(45) Date of Patent: Mar. 16, 2021

(54) LASER SCANNING DEVICE AND LASER SCANNING SYSTEM

(71) Applicants: HAN'S LASER TECHNOLOGY INDUSTRY GROUP CO., LTD., Shenzhen (CN); SHENZHEN HAN'S MOTOR S&T CO., LTD., Shenzhen (CN)

(72) Inventors: Guangneng Wang, Shenzhen (CN); Hongyan Qin, Shenzhen (CN); Yuting Li, Shenzhen (CN); Guoping Zhang, Shenzhen (CN); Bing Ding, Shenzhen (CN); Yunfeng Gao, Shenzhen (CN)

(73) Assignees: HAN'S LASER TECHNOLOGY INDUSTRY GROUP CO., LTD., Shenzhen (CN); SHENZHEN HAN'S SCANNER S&T CO., LTD., Shenzhen (CN)

( * ) Notice: Subject to any disclaimer, the term of this patent is extended or adjusted under 35 U.S.C. 154(b) by 881 days.

(21) Appl. No.: 15/551,906

(22) PCT Filed: Mar. 17, 2015

(86) PCT No.: PCT/CN2015/074341
§ 371 (c)(1),
(2) Date: Aug. 18, 2017

(87) PCT Pub. No.: WO2016/145603
PCT Pub. Date: Sep. 22, 2016

(65) Prior Publication Data
US 2018/0031824 A1    Feb. 1, 2018

(51) Int. Cl.
*H04N 9/31* (2006.01)
*G02B 26/10* (2006.01)
*B23K 26/082* (2014.01)

(52) U.S. Cl.
CPC .......... *G02B 26/101* (2013.01); *B23K 26/082* (2015.10); *H04N 9/3135* (2013.01)

(58) Field of Classification Search
CPC ... G02B 26/101; B23K 26/082; H04N 9/3135
(Continued)

(56) References Cited

U.S. PATENT DOCUMENTS

| 4,661,859 A | * | 4/1987 | Mailloux | H04N 1/4078 |
| | | | | 358/3.24 |
| 5,477,330 A | * | 12/1995 | Dorr | H04N 1/053 |
| | | | | 358/296 |

(Continued)

FOREIGN PATENT DOCUMENTS

| CN | 101256407 A | 9/2008 |
| CN | 201247408 Y | 5/2009 |

(Continued)

OTHER PUBLICATIONS

Altera Architecture Brief, "What is an SoC FPGA?," Jul. 2014, 4 pages.

(Continued)

*Primary Examiner* — Michael Lee
(74) *Attorney, Agent, or Firm* — Platinum Intellectual Property LLP

(57) ABSTRACT

A laser scanning device (10), comprising: a system on chip structure (110) configured to receive and process a graphic data transmitted by an external computer (20) to generate a galvanometer movement instruction and a laser control instruction; and galvanometer (120) configured to receive the galvanometer movement instruction and move according to the galvanometer movement instruction; wherein the laser control instruction is transmitted to an external laser (30), so that the laser (30) and the galvanometer (120) move synchronously. The above laser scanning device (10) and scan- (Continued)

ning system can integrate a laser control function and a galvanometer control function into the same chip by a system on chip design, which does not only reduce cost of the system, but also improve reliability of the system. Because all information are transmitted in the same one chip, there is no signal transmission cable employed between a conventional movement control card and a galvanometer driver, which results in a better real time, and avoids various problems due to transmission from the conventional control card to the galvanometer.

9 Claims, 3 Drawing Sheets

(58) Field of Classification Search
USPC .......................................................... 348/744
See application file for complete search history.

(56) References Cited

U.S. PATENT DOCUMENTS

| | | | | |
|---|---|---|---|---|
| 2002/0125222 | A1* | 9/2002 | Iwase | B23K 26/08 219/121.8 |
| 2004/0119813 | A1* | 6/2004 | Bush | B41J 2/47 347/259 |
| 2007/0187616 | A1* | 8/2007 | Burroughs | G02B 26/101 250/458.1 |
| 2009/0097108 | A1* | 4/2009 | Fox | G02B 21/0068 359/385 |
| 2009/0128717 | A1* | 5/2009 | Nagashima | H04N 9/3155 348/756 |
| 2009/0189923 | A1* | 7/2009 | Hirano | H04N 5/74 345/690 |
| 2009/0262314 | A1* | 10/2009 | Nishigaki | H04N 9/3129 353/98 |
| 2011/0141538 | A1* | 6/2011 | Mizumoto | G02B 26/0841 359/224.1 |
| 2013/0126469 | A1* | 5/2013 | Hino | B44C 1/227 216/24 |
| 2017/0347001 | A1* | 11/2017 | Ghofrani | A61B 3/102 |

FOREIGN PATENT DOCUMENTS

| | | |
|---|---|---|
| CN | 203390393 U | 1/2014 |
| CN | 204195057 U | 3/2015 |
| JP | 2008216873 A | 9/2008 |
| JP | 2013528492 A | 7/2013 |

OTHER PUBLICATIONS

Altera, Pin Information for the Cyclone © EPI C3T 144 Device, v. 1.4, 2006, 7 pages.

Dongyun et al., "An Embedded Laser Marking Controller Based on ARM and FPGA Processors," Hindawi Publishing Corporation, The Scientific World Journal, Mar. 18, 2014, 7 pages.

Samsung User's Manual, S3C2410X 32-Bit RISC Microprocessor, Rev. 1.2, 606 pages, 2003.

Indian Office Action dated Aug. 8, 2019 for the corresponding counterpart patent application in India.

* cited by examiner

LASER SCANNING DEVICE AND LASER SCANNING SYSTEM

RELATED APPLICATIONS

This application is a United States National Stage Application filed under 35 U.S.C 371 of PCT Patent Application Serial No. PCT/CN2015/074341, filed Mar. 17, 2015, the disclosure of all of which are hereby incorporated by reference in their entirety.

FIELD OF THE INVENTION

The present invention relates to a technical field of a laser marking, and particularly relates to a laser scanning device and a laser scanning system.

BACKGROUND OF THE INVENTION

FIG. 1 is a block diagram of a conventional laser scanning control system. The laser scanning control system includes a computer 201, a movement control card 202, a laser and a scanning head 206. The scanning head 206 includes a galvanometer driver 204 and a galvanometer 205. As shown in FIG. 1, the conventional laser scanning control system uses the solution that the movement control card 202 and the galvanometer driver 204 are separated. In other words, the movement control card 202 control light emitting of the laser and generate a galvanometer instruction; the galvanometer driver 204 drives the galvanometer 205 to move according to a given track. This solution can result in problems such as crosstalk, instruction transmission error and the like in the practical application due to the transmission cable between the movement control card 202 and the galvanometer driver 204.

Further, due to data unidirectional transmission, the system status, particularly the status of the galvanometer 205, cannot be obtained by the movement control card 202, and then the laser is controlled by a manner of open loop, which hardly achieves a better control effect. Particularly, in some occasions of a high performance requirement, the conventional solution generally achieves a certain scanning effect at the cost of efficiency, which cannot maximize the system effect.

SUMMARY OF THE INVENTION

Accordingly, it is necessary to provide a laser scanning device, which can reduce crosstalk of signal and instruction transmission error.

A laser scanning device includes:

a system on chip structure configured to receive and process a graphic data transmitted by an external computer to generate a galvanometer movement instruction and a laser control instruction; and a galvanometer, configured to receive the galvanometer movement instruction and move according to the galvanometer movement instruction; wherein the laser control instruction is transmitted to an external laser, so that the laser and the galvanometer move synchronously.

In one embodiment, the system on chip structure includes:

a processor module configured to receive the graphic data transmitted by the external computer and perform a coordinate correction and a track planning for the graphic data to generate the galvanometer movement instruction and the laser control instruction;

a logic processing unit configured to obtain the galvanometer movement instruction and the laser control instruction in accordance with a control period;

a galvanometer servo control module configured to receive the galvanometer movement instruction from the logic processing unit, and calculate a galvanometer drive voltage according to a position and a current feedback value of the galvanometer;

a laser control module configured to receive the laser control instruction from logic processing unit, and generate a laser control signal in accordance with a control time sequence of the laser and a feedback status of each galvanometer; and an IO control module, connected to the logic processing unit.

In one embodiment, the system on chip structure further includes a cache unit connected between the processor module and the logic processing unit, wherein the processor module writes the galvanometer movement instruction and the laser control instruction into the cache unit in a set format; the logic processing unit reads the galvanometer movement instruction and the laser control instruction within one control period at the beginning of each control period.

In one embodiment, the galvanometer servo control module comprises a first direction control unit, a second direction control unit, and a third direction control unit, which are communicatively connected to a first galvanometer, a second galvanometer and a third galvanometer through a first amplifier, a second amplifier and a third amplifier respectively.

In one embodiment, the first direction control unit, the second direction control unit and the third direction control unit are digital servo control units, and the first direction control unit, the second direction control unit and the third direction control unit are communicatively connected to the first galvanometer, the second galvanometer and the third galvanometer through digital to analog converters and analog to digital converters, respectively.

In one embodiment, the laser scanning device further includes a memory connected to the system on chip structure, the memory is configured to store the graphic data transmitted by the system on chip structure; the memory comprises a transitory storage unit and a non-transitory storage unit.

In one embodiment, the transitory storage unit is a DDR memory unit and the non-transitory storage unit is a flash unit.

In one embodiment, the processor module is a processor in chip, and the logic processing unit is a FPGA.

A laser scanning system includes a computer, a laser and the above laser scanning device; wherein the computer and the laser are connected to the laser scanning device; the computer generates a graphic data of a predetermined format according to a vector graphic document; the laser emits laser according to control of the laser scanning device.

In one embodiment, the computer is further configured to receive a feedback data of the laser scanning device, generate a monitoring status according to the feedback data, and debug the laser scanning device on line according to the feedback data.

The above laser scanning device and scanning system can integrate a laser control function and a galvanometer control function into the same chip by a system on chip design, which simplifies the whole laser scanning device, greatly reduces cost of the system, and improves reliability of the system. Because all information are transmitted in the same one chip, there is no signal transmission cable employed between a conventional movement control card and a galvanometer driver, which results in a better real time, and avoids various problems due to transmission from the conventional control card to the galvanometer, such as crosstalk of signal and instruction transmission error.

Because the galvanometer movement instruction generation and the servo control are implemented in the same chip, communication between the galvanometer movement instruction generation and the servo control is not limited, which can implement the control algorithm of more complexity and high performance.

DETAILED DESCRIPTION OF THE EMBODIMENTS

The present invention will be described in the following with reference to the accompanying drawings and the embodiments.

Figure 1:
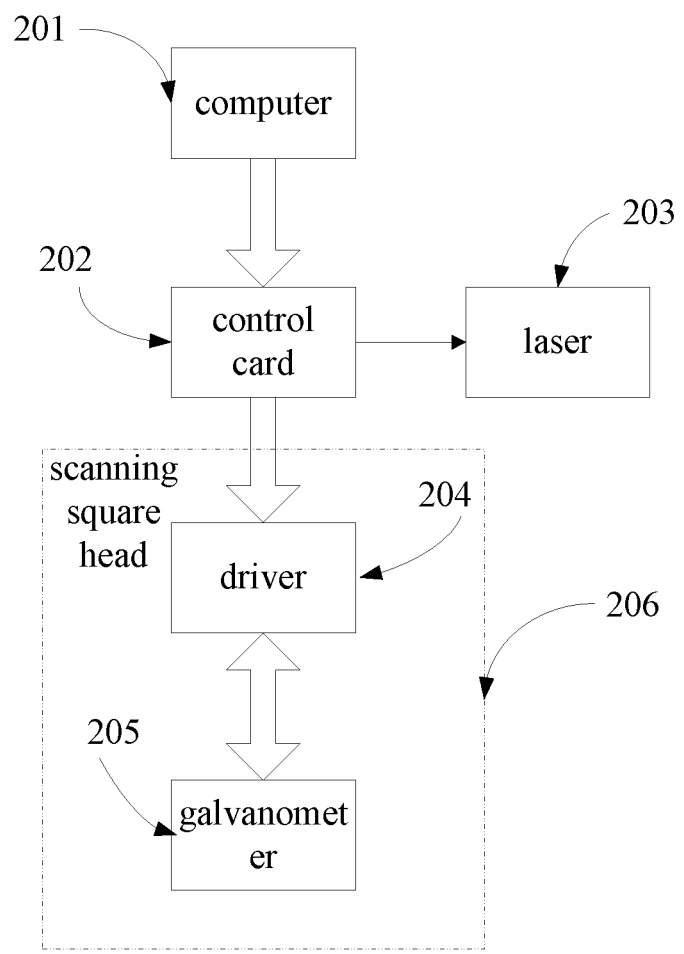
FIG. 1 is a block diagram of a conventional laser scanning device.
Figure 2:
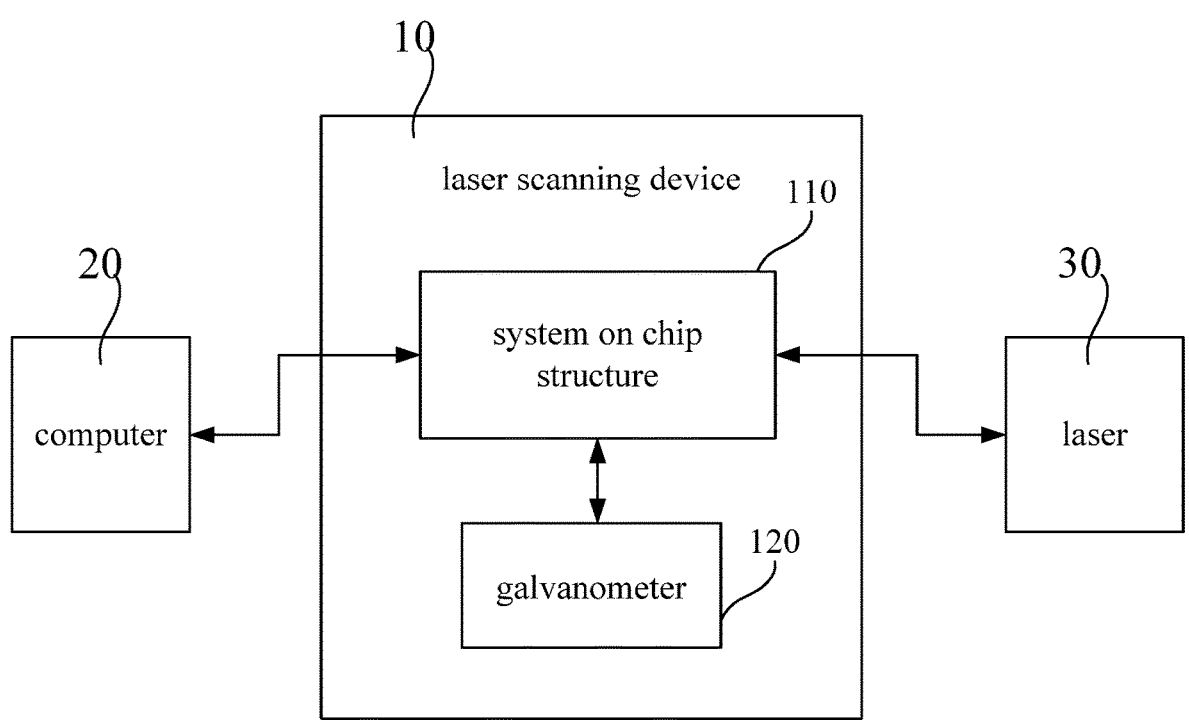
FIG. 2 is a block diagram of a laser scanning device according to an embodiment.

FIG. 2 is a block diagram of a laser scanning device in an embodiment. The laser scanning device 10 is also called a laser square head, which can be configured to receive a graphic data transmitted by an external computer 20 and control light emitting of the laser 30 to form a laser pattern on a workpiece. Data is transmitted between the laser scanning device 10 and the external computer 20 through a high speed data channel, such as an Ethernet interface, a USB interface or a 1394 interface.

The laser scanning device 10 includes a system on chip structure 110 and a galvanometer 120. The system on chip structure 110 is configured to receive and process a graphic data transmitted by an external computer 20 to generate a galvanometer movement instruction and a laser control instruction. The galvanometer 120 receives the galvanometer movement instruction and moves according to the galvanometer movement instruction. The laser control instruction is transmitted to an external laser 30, so that the laser 30 and the galvanometer 120 can move synchronously.

The above laser scanning device can integrate a laser control function and a galvanometer control function into a same chip by a system on chip design, which simplifies the laser scanning device as a whole, greatly reduces cost of the system, and improves reliability of the system. Because all information are transmitted in the same one chip, there is no signal transmission cable between a conventional movement control card and a galvanometer driver, which results in a better real time, and avoids various problems due to transmission from the conventional control card to the galvanometer, such as crosstalk of signal and instruction transmission error.

Because the galvanometer movement instruction generation and the servo control are implemented in the same chip, communication between the galvanometer movement instruction generation and the servo control is not limited, which can implement the control algorithm of more complexity and high performance, such as an adaptive control algorithm based on a electric motor model and a multi-stage feed forward control algorithm.

The specific structure of the system on chip structure 110 is illustrated here below.

Figure 3:
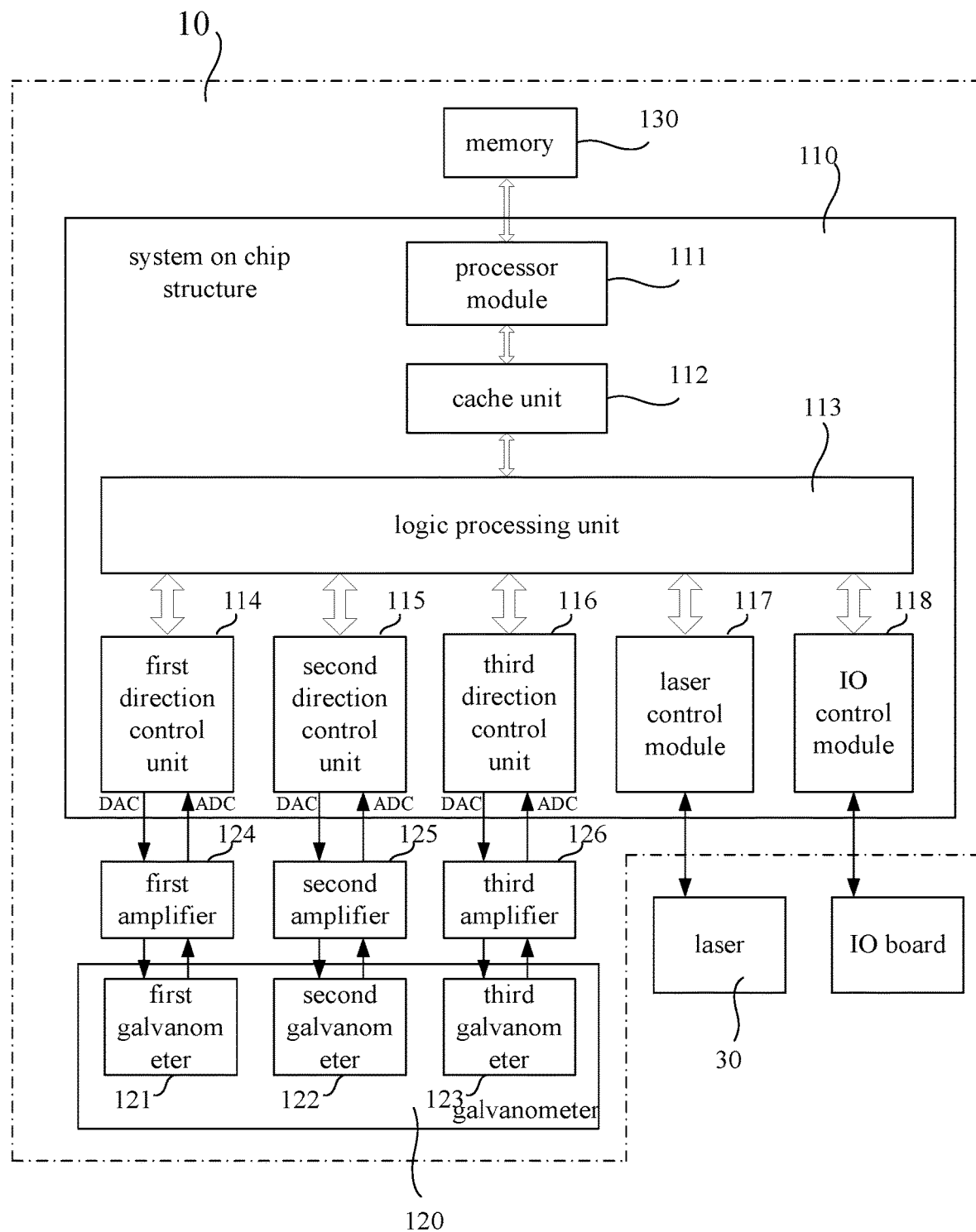
FIG. 3 is a block diagram of a system on chip structure in FIG. 2.

As shown in FIG. 3, the system on chip structure 110 includes: a processor module 111, a cache unit 112, a logic processing unit 113, a first direction control unit 114, a second direction control unit 115, a third direction control unit 116, a laser control module 117 and an IO control module; wherein the logic processing unit 113, the first direction control unit 114, the second direction control unit 115, the third direction control unit 116, the laser control module 117 and the IO control module are connected to the logic processing unit 113.

The processor module receives the graphic data transmitted by the external computer 10 and performs a coordinate correction and a track planning for the graphic data to generate the galvanometer movement instruction, the laser control instruction and an IO instruction. Here, the galvanometer movement instruction can be a conventional galvanometer position instruction. When it needs to improve a servo control performance, a speed instruction, an acceleration instruction, and a jerk instruction of the galvanometer can be also included. When a variable parameter control method is used, control parameters related to the galvanometer movement status can be also included. The processor module 111 can be implemented by using a processor in chip, i.e. the data processing core of the system on chip.

The cache unit 112 is connected between the processor module 111 and the logic processing unit 113; the processor module 111 writes the galvanometer movement instruction, the laser control instruction and the IO instruction into the cache unit 112 in a set format.

The logic processing unit 113 reads the galvanometer movement instruction, the laser control instruction and the IO instruction within one control period from the cache unit 112 at the beginning of each control period. The logic processing unit 113 can be implemented by using FPGA.

The galvanometer 120 includes a first galvanometer 121, a second galvanometer 122 and a third galvanometer 123, or an x galvanometer, a y galvanometer and a z galvanometer, i.e. a galvanometer in the three dimensions. The first direction control unit 114, the second direction control unit 115 and the third direction control unit 116 are communicatively connected to the first galvanometer 121, the second galvanometer 122 and the third galvanometer 123 respectively.

A galvanometer servo control module including the first direction control unit 114, the second direction control unit 115 and the third direction control unit 116 receives the galvanometer movement instruction from the logic processing unit 113, and calculates a galvanometer drive voltage to drive the first galvanometer 121, the second galvanometer 122 and the third galvanometer 123 respectively.

A laser control module 117 receives the laser control instruction from logic processing unit 113, and generates a laser control signal in accordance with a control time sequence of the laser 30 and a feedback status of each galvanometer.

Further, the first galvanometer 121, the second galvanometer 122 and the third galvanometer 123 are connected a first amplifier 124, a second amplifier 125 and a third amplifier 126 respectively, and then to the first direction control unit 114, the second direction control unit 115 and the third direction control unit 116 respectively.

Further, the first direction control unit 114, the second direction control unit 115 and the third direction control unit 116 are digital servo control units, generates and receives a digital signal. The first direction control unit 114, the second direction control unit 115 and the third direction control unit 116 are communicatively connected to the first galvanometer 121, the second galvanometer 122 and the third galvanometer 123 through digital to analog converters and analog to digital converters (not shown) to convert the digital signal of the galvanometer servo control module into the analog signal, or convert the analog signal of the galvanometer into the digital signal.

A memory 130 is connected to the system on chip structure 110 and can store the graphic data transmitted by the system on chip structure 130. The memory 130 includes a transitory storage unit and a non-transitory storage unit; the transitory storage unit is a high-speed accessed DDR memory and the non-transitory storage unit is a flash unit and the like. When work is on line, the graphic data of the external computer 20 can be stored in the transitory storage unit; and data can be read and processed in real time. When it needs to work off line, the graphic data transmitted by the external computer 20 can be firstly stored in the non-transitory storage unit. When the marking operation is performed off line, the graphic data is read from the non-transitory storage unit.

The system on chip structure 110 generates an IO instruction by an IO control module, and then can control an external IO board.

On the other hand, the feedback data, such as current, speed, position of the galvanometer and the like, obtained by the galvanometer servo control module can be upstream transmitted into the processor module 111, and upload to the computer by the processor module 111, for analyzing the galvanometer movement performance and debugging the galvanometer control parameters on line by user. in other words, the computer 20 receives the feedback data of the laser scanning device 10, and generates the monitoring status according to the feedback data or debugs the laser scanning device on line. The external computer can transmit the control parameters in combination with the graphic data to the laser scanning device 10, which can achieve the effect of close loop control, and then achieve a better synchronism of the galvanometer and laser control. Two-way transmission of data can also facilitate diagnosing fault and monitoring status by user, and simplifying maintenance.

Various technical features of the above embodiments can be combined in any manner. For clarity of description, all possible combinations of various technical features of the above embodiments are not described. However, as long as combinations of these technical features do not contradict with each other, they should be regarded within the scope described in the present specification.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A laser scanning device, comprising:
   a system on chip structure configured to receive and process a graphic data transmitted by an external computer to generate a galvanometer movement instruction and a laser control instruction, wherein the system on chip structure comprises:
      a processor module configured to receive the graphic data transmitted by the external computer and perform a coordinate correction and a track planning for the graphic data to generate the galvanometer movement instruction and the laser control instruction;
      a logic processing unit configured to obtain the galvanometer movement instruction and the laser control instruction in accordance with a control period;
      a galvanometer servo control module configured to receive the galvanometer movement instruction from the logic processing unit, and calculate a galvanometer drive voltage according to a position and a current feedback value of a galvanometer;
      a laser control module configured to receive the laser control instruction from the logic processing unit, and generate a laser control signal in accordance with a control time sequence of the laser and a feedback status of each galvanometer; and
      an IO control module, connected to the logic processing unit, and
   the a galvanometer configured to receive the galvanometer movement instruction and move according to the galvanometer movement instruction;
   wherein the laser control instruction is transmitted to an external laser, so that the laser and the galvanometer move synchronously.

2. The laser scanning device of claim 1, characterized in that, the system on chip structure further comprises a cache unit connected between the processor module and the logic processing unit, wherein the processor module writes the galvanometer movement instruction and the laser control instruction into the cache unit in a set format; the logic processing unit reads the galvanometer movement instruction and the laser control instruction within one control period at the beginning of each control period.

3. The laser scanning device of claim 1, characterized in that, the galvanometer servo control module comprises a first direction control unit, a second direction control unit, and a third direction control unit, which are communicatively connected to a first galvanometer, a second galvanometer and a third galvanometer through a first amplifier, a second amplifier and a third amplifier respectively.

4. The laser scanning device of claim 3, characterized in that, the first direction control unit, the second direction control unit and the third direction control unit are digital servo control units, and the first direction control unit, the second direction control unit and the third direction control unit are communicatively connected to the first galvanometer, the second galvanometer and the third galvanometer through digital to analog converters and analog to digital converters, respectively.

5. The laser scanning device of claim 1, characterized in that, further comprising a memory connected to the system on chip structure, the memory is configured to store the graphic data transmitted by the system on chip structure; the memory comprises a transitory storage unit and a non-transitory storage unit.

6. The laser scanning device of claim 5, characterized in that, the transitory storage unit is a DDR memory unit and the non-transitory storage unit is a flash unit.

7. The laser scanning device of claim 1, characterized in that, the processor module is a processor in chip, and the logic processing unit is a FPGA.

8. A laser scanning system, comprising a computer, a laser and a laser scanning device of claim 1; wherein the computer and the laser are connected to the laser scanning device; the computer generates a graphic data of a predetermined format according to a vector graphic document; the laser emits laser according to control of the laser scanning device.

9. The laser scanning system of claim 8, characterized in that, the computer is further configured to receive a feedback data of the laser scanning device, generate a monitoring status according to the feedback data, and debug the laser scanning device on line according to the feedback data.

\* \* \* \* \*